Figure 3:
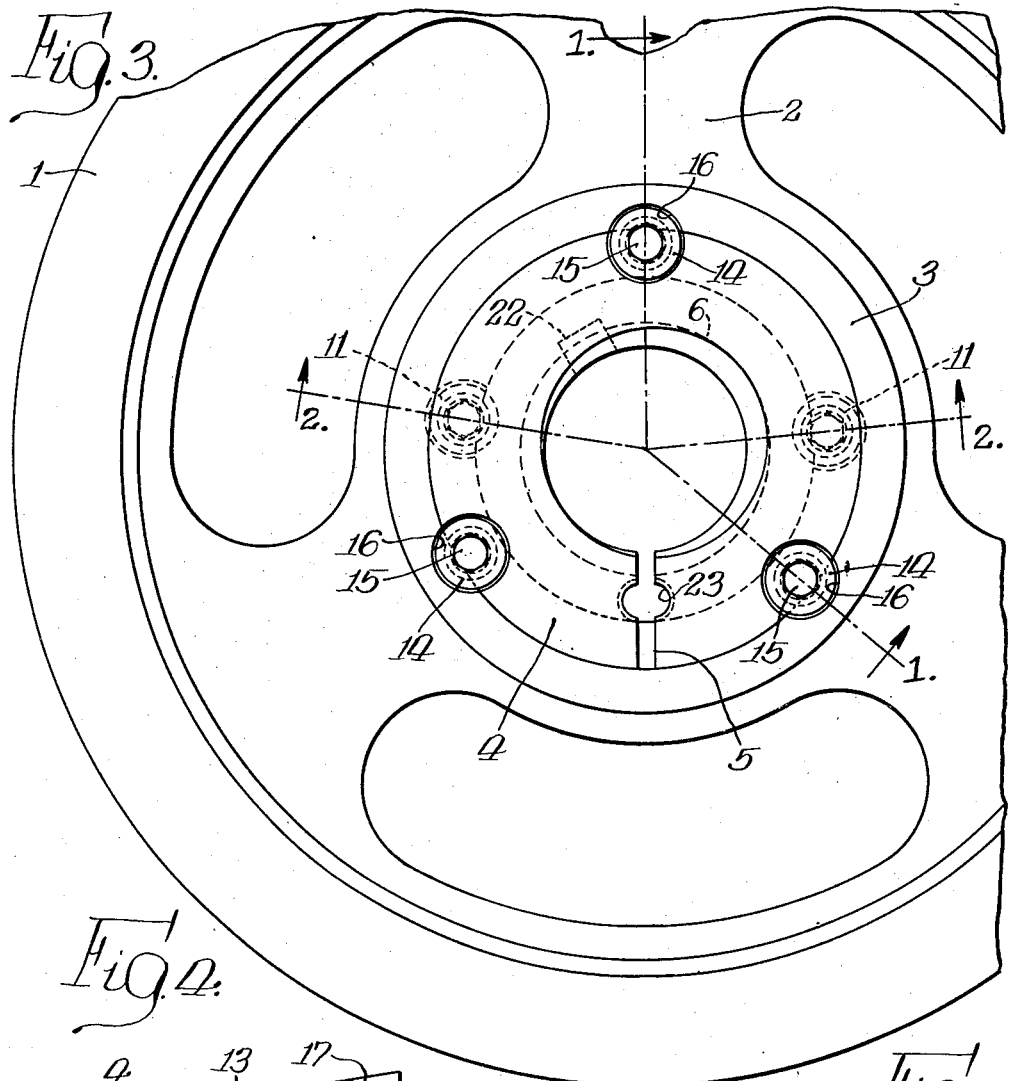

Aug. 22, 1950     D. FIRTH     2,519,958
WHEEL MOUNTING
Filed Nov. 21, 1947     3 Sheets-Sheet 1
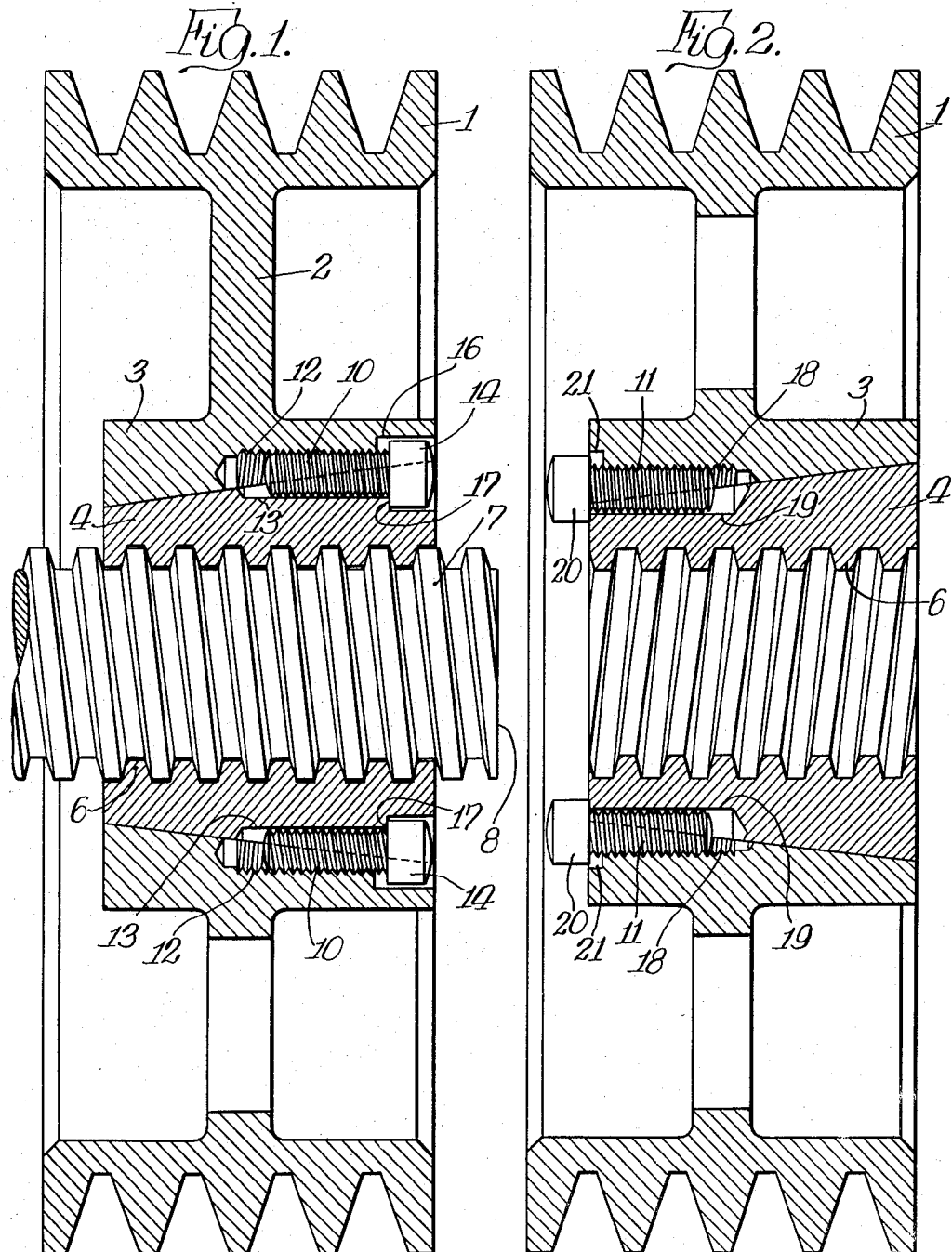
INVENTOR.
David Firth,
BY Osgood H. Dowell
Atty.

Aug. 22, 1950        D. FIRTH        2,519,958

WHEEL MOUNTING

Filed Nov. 21, 1947        3 Sheets-Sheet 2

INVENTOR.
David Firth,
BY Osgood H. Dowell
Atty.

Aug. 22, 1950     D. FIRTH     2,519,958
WHEEL MOUNTING
Filed Nov. 21, 1947     3 Sheets-Sheet 3
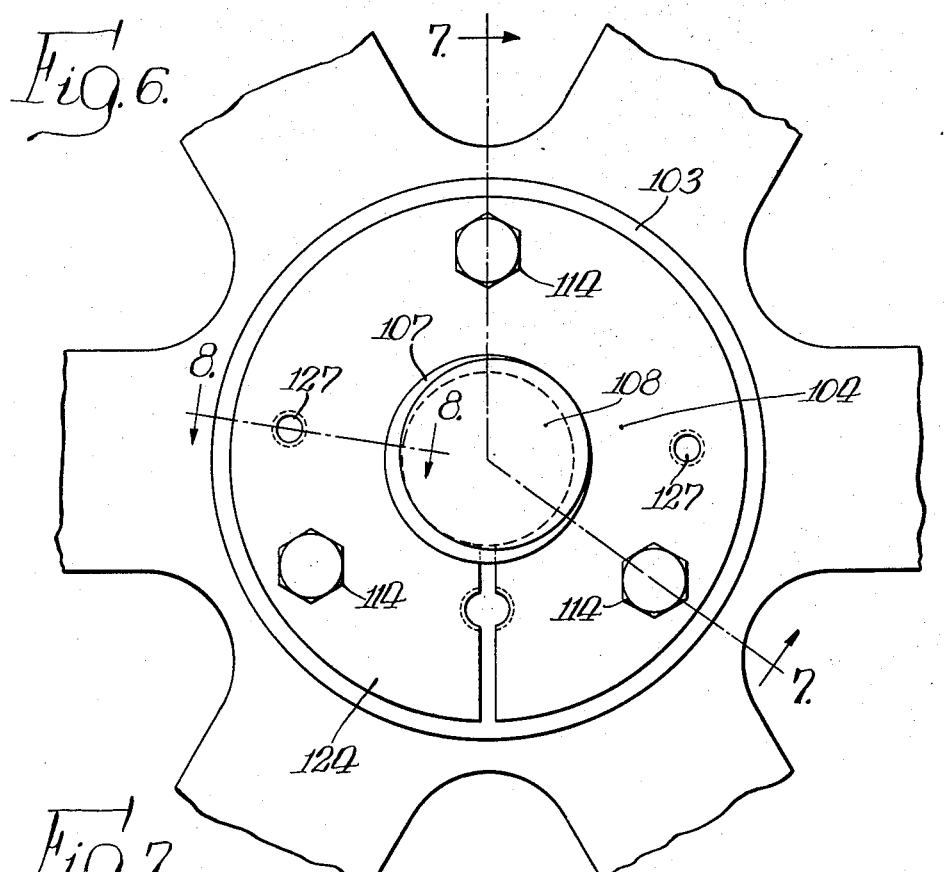
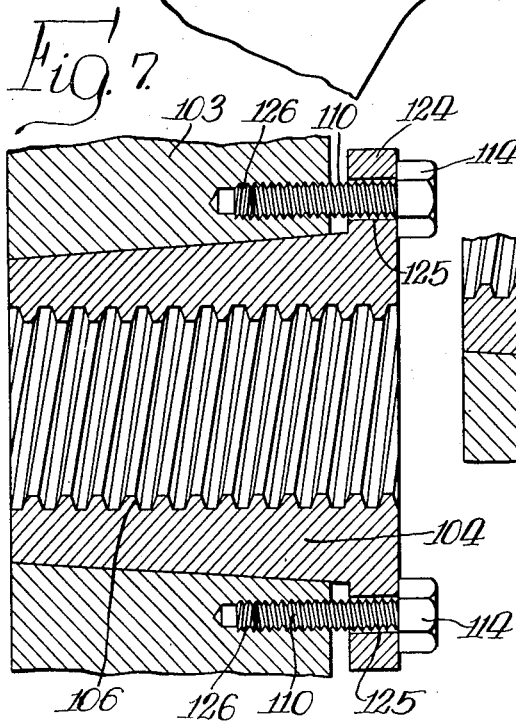
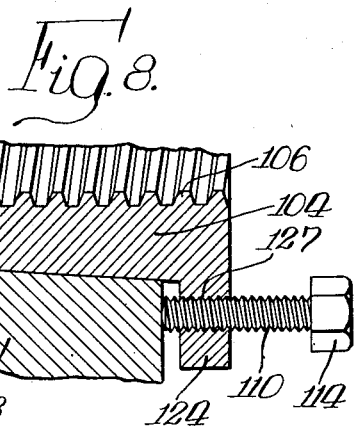
INVENTOR.
David Firth,
BY Osgood H. Dowell
Atty.

Patented Aug. 22, 1950

2,519,958

UNITED STATES PATENT OFFICE 2,519,958

WHEEL MOUNTING

David Firth, South Bend, Ind., assignor to Dodge Manufacturing Corporation, Mishawaka, Ind., a corporation of Indiana Application November 21, 1947, Serial No. 787,336

7 Claims. (Cl. 287—52.06)

This invention pertains to a mounting for a pulley or other wheel on a shaft to drive or to be driven by the wheel, and more particularly to the type of mounting wherein the wheel hub is fastened to the shaft by an interposed tapered split contractible bushing fitting a tapered bore in the hub and wedged between the hub and shaft. In a mounting of this type having a smooth bored bushing fitting a smooth-surfaced shaft, the hold with which the bushing grips the shaft is less powerful than that with which it grips the hub, due to the fact that the gripping surfaces of the shaft and bushing are of sharper curvature as well as less area than the gripping surfaces of the hub and bushing. While it is usually unnecessary to key the bushing to the hub, it is common practice to key the bushing to the shaft, without which the torque transmissible from the shaft to the hub would be considerably less than that capable of transmission from the bushing to the hub.

Objects of the present invention are to obtain, in a wheel mounting of the type referred to, a friction-clutching connection between the shaft and bushing comparable in holding power to that with which the bushing grips the hub, or capable of transmitting relatively high torque, and to enable the wheel, when the bushing is released from gripping engagement with the shaft, to be adjusted axially by rotating the wheel. Further objects ancillary or subsidiary to the foregoing will be understood from the following description.

For the purposes stated, the invention utilizes a screw-threaded shaft on which the wheel is mounted as aforesaid through the medium of a bushing which is internally threaded for screwing on the shaft while the bushing is in uncontracted state, the interengaging threads of the shaft and bushing being of appropriate form and proportions for interwedging of their convolutions by contraction of the bushing. The hub and bushing are connected by screw means arranged for drawing or forcing the hub tight on the bushing to compress it tight on the shaft, whereby the bushing becomes in effect wedged between the hub and shaft. Provision is also made whereby to back the hub off from the bushing by screw means, for dewedging or releasing the bushing, so as to permit it to resume its uncontracted state and enable the wheel to be demounted. Should the bushing when dewedged fail to release itself from gripping engagement with the threaded shaft, it may be expanded to uncontracted state by use of a spreading tool as hereinafter described.

The operations of forcing the hub on the bushing to compress it tight on the shaft, and for backing off the hub to release the bushing from compression by the hub, are hereinafter referred to as the wedging and dewedging of the bushing. The wheel may be provided with any suitable screw equipment by which to accomplish these operations, e. g. one screw means for the wedging and another for the dewedging, or screws interchangeably usable in one arrangement for wedging and another for dewedging, of which an example is disclosed in patent to Firth, No. 2,402,-743 of June 25, 1946, or by screw means operable in one direction for wedging and in the reverse direction for dewedging, of which an example is disclosed in patent to Firth, No. 2,396,414 of March 12, 1946.

Assuming the interengaging screw threads of the shaft and bushing to be of appropriate form and proportions for interwedging of their convolutions, a tight wedging of the bushing will give a driving connection between the hub and shaft capable of transmitting relatively high torque, by the gripping of the hub by the bushing under great pressure and the tight binding of the interengaging screw threads.

For a wheel other than a small sheave, sprocket or the like, the hub should be so connected to the bushing, either by screws utilized for the wedging operation or by other suitable means, that the bushing when loose in the hub can be screwed on the shaft by rotating the wheel, thus enabling the wheel to be moved along the shaft, in the operations of mounting, demounting and axially adjusting, by simply rotating the wheel. This is very advantageous in a mounting for a heavy wheel, and especially so if the shaft should be at an inclination to the horizontal and axial adjustment should require moving the wheel along the shaft on the upgrade.

An illustrative embodiment of the invention in one practicable form is shown in Figs. 1 to 5 of the accompanying drawings, and another embodiment thereof is represented by additional figures.

Figure 4:
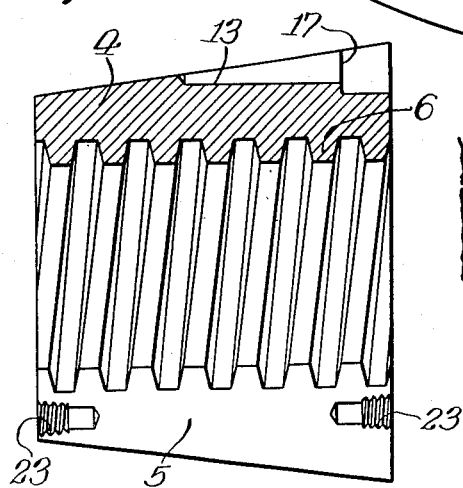
Figure 5:
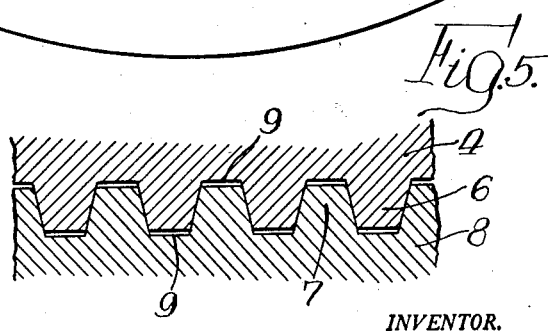

Figs. 1 to 5 illustrate a construction in which the wheel has a flangeless bushing and screw equipment of a preferred type and arrangement for the wedging and dewedging of the bushing. Fig. 1 is a sectional view of the mounted wheel, the section being taken on the angled line 1—1 of Fig. 3, looking in the directions indicated by the arrows, and the screw shaft on which the wheel is mounted being shown in elevation. Fig. 2 is a section of the unmounted wheel taken on the angled line 2—2 of Fig. 3, looking in the direction of the arrows. Fig. 3 is a front elevation of said wheel. Fig. 4 is a longitudinal section of the bushing taken on the vertical center line of Fig. 3. Fig. 5 is a diagrammatic representation of interengaging shaft and bushing threads of a type best adapted for the purpose of the invention.

Figs. 6 to 8 illustrate a construction in which the wheel is equipped with a flanged bushing and screw means for the wedging and dewedging functions of specifically different character from that of the construction first illustrated. Fig. 6 is a front end elevation of the mounted wheel hub. Fig. 7 is a section of the unmounted hub taken on the angled line 7—7 of Fig. 6, looking in the directions indicated by the arrows. Fig. 8 is a partial section on the line 8—8 of Fig. 6, showing one of the screws arranged for dewedging.

Referring first to Figs. 1 to 5, the wheel shown is a multiple V-belt sheave having its grooved rim 1 supported from the wheel hub 3 by a connecting web 2. The hub 3 has a tapered bore in which fits a resilient tapered bushing 4 split longitudinally as indicated at 5 to permit contraction thereof. Said bushing has its bore tapped to form a large internal screw thread 6 matching the thread 7 of a screw shaft or axle 8 on which the wheel is shown mounted in Fig. 1. Preferably the wheel is arranged for mounting so that the end of the hub containing the large end of the bushing is its front end. It will be understood that when the bushing 4 is in uncontracted state, an appropriate working clearance exists between the interengaging screw threads 6 and 7. The shaft thread 7 has a free or unobstructed forward extremity to permit screwing the wheel onto the shaft. After the wheel is screwed on and adjusted to desired position, the bushing can be wedged by tightening the screws 10, thereby drawing the hub tight on the bushing and compressing the bushing tight on the threaded shaft. This results in a tight binding of the interengaging threads 6 and 7, which are of wedge-shaped cross-section and proportioned for interwedging of their convolutions. Although the two threads shown are of identical form and dimensions in cross-section, and of precisely the same radial dimensions as the spiral grooves which are cut to form the threads, their transverse dimensions, in a plane in which the shaft axis lies, are slightly greater than the corresponding dimensions of said grooves, so that when the clearance at the sides of the threads is taken up by contraction of the bushing, there is still left clearance between the tops of the threads and bottoms of the grooves, as indicated at 9 in Fig. 5. Hence when the bushing is tightly wedged, the interengaging threads 6 and 7 are in tight gripping engagement at both sides of the threads.

The threads 6 and 7 should be of suitable size or appropriate form and proportions to withstand the strains of tight binding without injury. Large threads are also desirable for correspondingly large pitch and correspondingly large lateral areas in gripping engagement. The threads shown in this instance are of the type known in the screw industry as Acme threads. These are broad-topped threads with sloping sides of steep slant, and are desirable because of these characteristics as well as because of their sturdiness and their relatively large pitch.

For obtaining a friction-clutching connection between the shaft and bushing of relatively high torque-transmitting capacity, interengaging screw threads of ordinary V-shaped cross-section could be used, if formed by cutting spiral V-grooves in the shaft and bushing and truncating or cutting off the ridges of the threads, so as to enable the convolutions of the bushing threads to be wedged between the convolutions of the shaft threads. But further substantial advantage in this respect is gained by use of Acme threads which, on account of the relatively steep slant of their sides, can be wedged much more tightly than standard V-threads. Standard Acme threads have sides of such slant that the included angle between confronting sides of adjacent thread convolutions is only twenty-nine degrees, so that the slant of the sides is at an angle of only fourteen and one-half degrees to a radial plane.

Still further mechanical advantage may be gained by use of Acme threads formed with sloping sides of still steeper slant. A slant such that the included angle aforesaid is only twenty degrees, so that the sides slope at an angle of only ten degrees to a radial plane, is practicable.

To permit such tight wedging of the bushing as to obtain a press tight fit of the hub thereon, it is desirable that the angle of taper of the bushing, i. e. the included angle between diametrically opposite contour lines of the bushing, be less than thirteen degrees. An extremely slight taper might result in such extremely tight wedging as to render dewedging unduly difficult. An angle of taper of from about six to nine degrees is preferred.

For effecting the wedging and dewedging of the bushing, the screw equipment of the illustrative wheel is of the type disclosed in the hereinbefore mentioned Firth Patent 2,402,743, which permits utilization of a flangeless bushing 4 directly connected with the hub by enclosed pull screws arranged parallel with the movement of the hub relative to the bushing. The specific equipment shown in this instance comprises wedging screws 10 inserted in the front end of the hub in threaded engagement therewith, and dewedging screws 11 in the opposite end of the hub in threaded engagement therewith, both sets of screws being partially in the bushing and adapted to be tightened against the bushing or thrust shoulders thereon. Aside from the convenience afforded by this particular arrangement, it obtains the advantage that all of the screws are in threaded engagement with the hub. The holes for the wedging screws 10 are provided partly by internal hub grooves 12 having tapped walls forming female screw threads engaged by the threads of said screws, said female threads being mutilated or cut by the tapered hub bore, and partly by smooth-walled bushing grooves 13 confronting said hub grooves and of appropriate curvature for cooperation therewith to provide screw-holes in which said screws can be operatively fitted. Said wedging screws 10 are shown as cap screws having cylindrical heads 14 provided with wrench sockets 15 (Fig. 3). The screw-holes are counterbored to receive said screw-heads, the counterbored portions 16 of the holes being deeper in the hub than in the bushing, thereby providing thrust shoulders 17 on the bushing against which the screw-heads bear. The holes for the dewedging screws 11 are likewise provided by hub grooves 18 having tapped or threaded walls and confronting bushing grooves 19 having smooth or threadless walls. Said dewedging screws 11 are shown as cap screws the heads 20 of which bear against the small end of the bushing 4. In this instance the holes for the dewedging screws are shown counter-bored only in the hub, as indicated at 21, to allow the screw heads 20 to enter the hub as the screws are tightened for the dewedging operation.

The wheel hub 3 can be forcibly moved axially relative to the bushing by the screws of either set if the opposing screws are loosened and sufficiently retracted to allow such movement. By tightening the screws 10 while the screws 11 are retracted, the hub can be drawn tight on the bushing to wedge it by compression between the hub and shaft, with resultant gripping of the tapered surfaces of the hub and bushing under great pressure and a tight binding of the interengaging screw threads 6 and 7 of the shaft and bushing. Thus the wheel hub is secured fast on the shaft in concentric relation thereto, with a driving connection between them for high torque-transmission. Upon loosening and retracting the screws 10, the hub can be backed off from the bushing to release it by tightening the dewedging screws 11. If desired, two of the three wedging screws 10 with which the wheel is shown provided (the heads 14 of which screws appear in Fig. 3) could after the wedging operation be withdrawn and utilized for dewedging in place of the screws 11. In other words, screws 10 could be interchangeably used for the respective operations.

Should the bushing when dewedged fail to release itself from gripping engagement with the shaft, due to tight binding of the interengaging shaft and bushing threads, or in case the bushing after long service in wedged condition should have become set in contracted state, its release from the shaft can be effected by forcing an appropriate spreading tool into the bush-split. To facilitate spreading or expanding it under such circumstances, the bushing 4 is shown provided at the opposite ends of its longitudinal slot 5 with longitudinal grooves or recesses 23 in the confronting walls of said slot, in the form of segments of conical screw-holes. When the bushing is contracted, the opposing recesses 23 cooperate to form approximately conical screw-holes intersected longitudinally by the slot 5, in which a suitable tool, e. g. a piece of iron pipe having a threaded end, can be worked to spread or expand the bushing.

It will be apparent that the construction described is of highly practicable character for the purposes of the invention. The bushing 4 is so connected to the hub by the wedging screws 10, and in this instance also by the dewedging screws 11, that the bushing when loose in the hub can be screwed onto and off from the shaft by rotating the wheel. Incidentally, if only one of the several screws should be in place, the bushing would still be so connected to the hub by such single screw. Hence the wheel can be mounted by screwing it on the shaft and tightening the screws 10, assuming the screws 11 to have been sufficiently retracted to allow wedging of the bushing, and can be demounted by dewedging the bushing, expanding it if necessary to effect its release from the threaded shaft, and unscrewing the wheel from the shaft. To change the axial position of the wheel at any time, it is only necessary to dewedge and expand the bushing, rotate the wheel in the direction required for adjustment, and again wedge the bushing. And in whatever angular position the wheel may assume as an incident to adjustment, a driving connection of relatively high torque-transmitting capacity is obtainable.

In a properly designed embodiment of the invention for either moderately high or heavy duty, the driving connection between the shaft and bushing obtained by tight interwedging of the interengaging shaft and bushing threads would probably be sufficient to meet the great majority if not all torque-transmitting requirements for which such embodiment would be otherwise appropriate. While the connection so obtained may if desired be supplemented by provision of means for keying the bushing to the shaft, it is thought the use of such keying means would seldom if ever be necessary if the interengaging screw threads of the shaft and bushing were of the type shown and described with reference to Fig. 5.

Where an embodiment of the invention is to be used for a duty so relatively severe, considering the design and proportions of such embodiment, that keying of the bushing to the shaft may be necessary or advisable, the shaft and bushing may be formed with mating keyways or longitudinal grooves for reception of a removable key to fit slidably in said grooves, in which case, before wedging the bushing, the wheel need be given only a half turn or less for registering such grooves. Such a groove or keyway in the bushing is indicated in dotted lines at 22 in Fig. 3, being so indicated because it is not contemplated that a key will be ordinarily needed or used. If it is to be used, a similar keyway or groove should be cut in the threaded shaft for the full length of its screw or threaded portion. The key if used may be inserted before wedging the bushing if the proportions of the key relative to the depth of the grooves in which it slidably fits are such as to leave ample clearance between the key and grounds or bottoms of said grooves, so as to avoid any interference with contraction and tight wedging of the bushing. A straight key which can be easily driven into the grooves is preferred, in lieu of which, however, a tapered key could be employed, to be driven between a seat provided by the shaft groove and a seat provided in the bushing by a groove therein of gradually diminishing depth. The key, whether straight or tapered, should be removable. It may have a head which when the key is in place is sufficiently spaced from the adjacent end of the bushing to permit driving a wedge therebetween for forcing out the key. Or, the head of the key could be connected to the bushing by a cap screw passing loosely through a relatively large threaded hole in said head and screwed into a threaded hole in the bushing, by tightening of which screw the key could be forced into place, and upon withdrawal of which screw a larger screw could be engaged in the threaded hole in said head and tightened against the bushing for forcing out the key.

In some cases, it may be desirable to use embodiments of the invention primarily to permit easy axial adjustment of heavy wheels, rather than for transmission of high torque independently of keying means. Since the advantage of the invention in permitting axial adjustment by screwwise movement of the wheel is not dependent upon the cross-sectional form of the interengaging screw threads of the shaft and bushing, the use in a wheel mounting of the type herein described of interengaging shaft and bushing threads other than wedge-shaped, or even of square cross-section, is not intended to be excluded from the broad scope of the invention. If square threads were utilized, it would be desirable to form one of them of less radial dimension than the other, so that when the bushing is wedged it will tightly grip the shaft by engagement of the top of one thread with the bottom of the groove cut to form the other thread. Even with such square threads substituted for the threads 6 and 7, a driving connection between shaft and bushing suitable for many substantial torque-transmitting requirements can be established by wedging the bushing in tight gripping engagement with the shaft, and if transmission of high torque is necessary or desired, provision therefor can be made by keying the bushing to the shaft in the manner hereinbefore described.

In Figs. 6 to 8, a pulley having its rim (not shown) connected by spokes to the wheel hub 103 is mounted on a screw shaft 108 through the medium of a tapered split contractible bushing 104 having an internal large screw thread 106 matching and interengaged with the shaft thread 107, said bushing fitting the tapered bore of the hub and connected with the hub by screws 110 for drawing the hub on the bushing to compress it tight on the shaft, thereby establishing a driving connection for high torque-transmission as hereinbefore explained, the threads 106 and 107 being of suitable form and proportion for interwedging of their convolutions. In this instance the bushing has its large end extended and formed with a flange 124 to which said screws 110 are anchored, these being cap screws passing loosely through said flange in unthreaded holes 125 and screwed into the hub in threaded screw-holes 126, with the heads 114 of said screws abutting said flange. For dewedging or releasing the bushing from the hub, two of the three screws shown are withdrawn from the hub and passed through the bushing flange 124 in threaded engagement therewith in threaded screwholes 127 and tightened against the hub in the manner shown in Fig. 8. When the bushing becomes dewedged, the one screw remaining in threaded engagement with the hub (it having been sufficiently retracted to permit the dewedging) connects the bushing to the hub in such manner that the bushing when loose in the hub can be screwed on and off from the shaft by rotating the wheel.

It is within contemplation to utilize, in an embodiment of the invention, a double or triple threaded or other plural threaded shaft and a corresponding interiorly threaded bushing. In other words the shaft and bushing may be formed with interengaging pluralities of screw threads of large pitch, each thread of the bushing fitting between two threads of the shaft, and vice versa. The effect would be to increase the resistance to turning of the wheel relative to the shaft when the bushing is uncontracted, and hence to increase the torque-transmitting capacity of the friction-grip connection between the shaft and bushing. In the appended claims, interengaging threads will be understood to include such interengaging pluralities of threads.

The invention may be variously applied to the mounting of pulleys, gears and other wheels or machine elements for power-transmission, traction wheels of tractors, flywheels and other wheels for driving or to be driven or rotated by the shafts or axles on which they are mounted.

The invention may be used to great advantage for the mounting of the driving wheels of farm tractors, since it not only affords such torque-transmitting connections between the wheel hubs and driving axle shafts as to reduce or minimize if not to obviate keying requirements, but also enables the heavy driving wheels, after they have been jacked up for the purpose, to be easily adjusted axially, whereas axial adjustment of such wheels mounted in an ordinary manner is often an appalling job. It will be understood that to adjust a tractor driving wheel, it must first be raised from the ground by jacking up the driving axle shaft at one end, thus inclining the shaft, and that if the adjustment must be made by sliding the heavy wheel, usually weighing several hundred pounds, along the inclined axle on the up grade, the effort required may be beyond a man's strength. In the case of a wheel mounted in accordance with the present invention, the corresponding effort is the relatively light one of rotating a wheel in threaded engagement with its axle in one direction or the other, according to whether the wheel is to be adjusted in or out.

A tractor driving wheel and axle shaft assembly having wheel mountings embodying this invention is the subject of an application, Serial Number 787,335, filed by the present inventor concurrently herewith.

I claim:

1. A wheel mounting comprising a taper-bored hub, a screw-threaded shaft, a tapered split radially contractible bushing fitting the bore of said hub and having an internal screw thread matching and interengaged with the thread of said shaft, the bushing when uncontracted being screwable on and off from said shaft, said threads being of wedge-shaped cross-section and interwedgeable by radial contraction of the bushing, and screw equipment for forcing the hub on the bushing to compress it on the shaft with resultant binding of said threads and for backing the hub from the bushing to release it.

2. A wheel mounting comprising a taper-bored hub, a screw-threaded shaft, a tapered split radially contractible bushing fitting the bore of said hub and having an internal screw thread matching and interengaged with the thread of said shaft, the bushing when uncontracted being screwable on and off from said shaft, said threads being broad-topped threads with sloping sides of steep slant and interwedgeable by radial contraction of the bushing, and screw equipment for forcing the hub on the bushing to compress it on the shaft with resultant binding of said threads and for backing the hub from the bushing to release it.

3. A wheel mounting comprising a taper-bored hub, a screw-threaded shaft, a tapered split radially contractible bushing fitting the bore of said hub and having an internal screw thread matching and interengaged with the thread of said shaft, the bushing when in uncontracted state being screwable on and off from said shaft, and screw equipment for forcing the hub on the bushing to compress it tight on said shaft and for backing the hub from the bushing to release it.

4. A mountable unit comprising a wheel hub having a tapered bore, a tapered split radially contractible bushing fitting said hub bore, said bushing having a tapped bore forming an internal screw thread and adapted when in uncontracted state to be screwed on a correspondingly threaded shaft, and screw equipment for forcing said hub on said bushing to compress it tight on said shaft and for backing the hub from the bushing to release it.

5. A mountable unit comprising a wheel hub having a tapered bore, a tapered split radially contractible bushing fitting said hub bore, said bushing having a tapped bore forming an internal screw thread and adapted when in uncontracted state to be screwed on a correspondingly threaded shaft, and screw equipment for forcing said hub on said bushing to compress it tight on such shaft and for backing the hub from the bushing to release it, the bushing being so connected to the hub that the bushing when in uncontracted state and loose in the hub can be screwed on such shaft by rotating the wheel.

6. A mountable unit comprising a wheel hub having a tapered bore, a tapered split contractible bushing fitting said hub bore, said bushing having a tapped bore forming an internal screw thread and adapted when in uncontracted state to be screwed on a correspondingly threaded shaft, and screw equipment for forcing said hub on said bushing to compress it tight on such shaft and for backing the hub from the bushing to release it, said equipment comprising two sets of longitudinally disposed screw holes formed partially in the hub and partially in the bushing and screws operable in said holes, the screw holes of each set having tapped walls in one of the hub and bushing and threadless walls in the other and said other having thrust shoulders against which screws operated in engagement with said tapped walls can be tightened, the two sets of holes and associated thrust shoulders being in reverse operative relation, the screws arranged in either of said sets of holes connecting the bushing to the hub in such manner that the bushing when in uncontracted state and loose in the hub can be screwed on said shaft by rotating the wheel.

7. A mountable unit comprising a wheel hub having a tapered bore, a tapered split contractible bushing fitting said hub bore, said bushing having a tapped bore forming an internal screw thread and adapted when in uncontracted state to be screwed on a correspondingly threaded shaft, and screw equipment for forcing said hub on said bushing to compress it tight on such shaft and for backing the hub from the bushing to release it, said equipment comprising two sets of longitudinally disposed screws arranged for insertion in opposite ends of the hub, all of said screws being in threaded engagement with the hub and adapted to be tightened against the bushing.

DAVID FIRTH.

REFERENCES CITED

The following references are of record in the file of this patent:

UNITED STATES PATENTS

| Number | Name | Date |
|---|---|---|
| 827,346 | Bubb | July 31, 1906 |
| 1,142,296 | Bellerose | June 8, 1915 |
| 1,849,068 | Bridges | Mar. 15, 1932 |
| 2,324,681 | Dekker | July 20, 1943 |
| 2,396,414 | Firth | Mar. 12, 1946 |
| 2,402,743 | Firth | June 25, 1946 |